United States Patent Office 2,830,961
Patented Apr. 15, 1958

2,830,961

INTERPOLYMER OF NUCLEAR METHYLATED STYRENES, ESTERS OF DRYING OIL ACIDS AND DIALKENYL AROMATICS AND METHOD FOR MAKING SAME

Norman R. Peterson, Walter A. Henson, and Douglas P. Churchfield, Midland, Mich., assignors to The Dow Chemical Company, Midland, Mich., a corporation of Delaware No Drawing. Application October 22, 1953
Serial No. 387,794

12 Claims. (Cl. 260—22)

This invention concerns certain new interpolymers prepared from natural or synthetic drying oils; one or more nuclear methylated styrenes, preferably ar-vinyltoluene; and one or more dialkenyl aromatic hydrocarbons, e. g. divinylbenzene, as the essential starting materials. The interpolymers are compatible with a wide range of varnish solvents, have a property of hardening, i. e. drying, under exposure to air, and when dried are exceptionally resistant to the solvent action of liquid paraffinic hydrocarbons such as gasoline. They are useful as resin ingredients for the preparation of coating compositions such as varnishes, paints and enamels. The invention is concerned particularly with interpolymers of the kinds just mentioned which have a gel structure, but nonetheless are compatible with most varnish solvents, and are stable, i. e. remain compatible with such solvents, during storage in closed containers out of contact with air.

The interpolymers of the invention are compatible with varnish solvents having kauri butanol numbers of 33 and higher, e. g. they can be dissolved or dispersed in organic liquids composed for the most part of aromatic hydrocarbons, or alicyclic hydrocarbons, or aliphatic hydrocarbons or mixtures thereof. Thus, relatively inexpensive solvents such as mineral spirits can satisfactorily be used in preparing varnishes, paints, or enamels from the interpolymers. In this respect, they differ from the interpolymers of styrene, drying oils and divinylbenzene, and mixtures thereof with other vinyl aromatic compounds, which are disclosed in U. S. Patents Nos. 2,468,747 and 2,468,798. The interpolymers of said patents are compatible with solvents consisting predominantly of aromatic hydrocarbons such as benzene and toluene, but are not compatible to form clear varnishes with less expensive solvents such as mineral spirits which are satisfactory as solvents for the interpolymers of this invention.

Many of the interpolymers of this invention possess a gel structure in the sense that fairly concentrated dispersions of the same in organic liquids, such as mineral spirits, are gelatinous. They presumably comprise crosslinked polymer molecules. The interpolymers having the gel structure are unusual in that they remain stable, i. e. dispersions of the same in solvents are stable and do not increase greatly in viscosity, during storage for several months or longer in closed containers, even in instances in which paint driers are admixed therewith prior to the storage. Most varnish resins, when brought to such gel state, become insoluble in varnish solvents when similarly stored.

The new interpolymers having the gel structure are particularly useful for the manufacture of varnishes, paints and enamels. Because of their stability out of contact with air, they may be stored, shipped and used, when desired, in making the coating compositions. They may be used in smaller proportions than most varnish resins to prepare coating compositions which are sufficiently viscous for convenient application with a brush. For instance, solutions of 60 parts by weight of such interpolymers in 40 parts of mineral spirits usually have a Gardner-Holdt viscosity of T or above. Such solutions can be thinned with further amounts of a solvent to form varnishes of sufficiently lower viscosity, e. g. from C to H, for convenient application by brushing, dipping, or in other usual ways. The dilution with an inexpensive solvent, e. g. mineral spirits, reduces the cost of the final coating composition. The interpolymers having the gel structure do not penetrate as deeply or extensively into wood, masonry, or other porous bodies to which coating compositions comprising the interpolymers are applied, as do most other varnish resins when similarly applied. For this reason, coating compositions comprising the interpolymer gels have good covering power as regards the area that may be coated per pound of the resin, i. e. interpolymer, ingredient.

All of the interpolymers provided by the invention comprise a nuclear methylated styrene, preferably vinyltoluene; one or more natural or synthetic drying oils; and one or more dialkenyl aromatic hydrocarbons having the general formula:

wherein R and R' are members of the group consisting of vinyl and isopropenyl radicals, polymerized together in the relative proportions hereinafter specified. Other nuclear alkylated styrenes such as ar-ethylvinylbenzene, ar-isopropylvinylbenzene, or ar-isopropylisopropenylbenzene, may be present in the mixtures used in forming the interpolymers and may become chemically combined in the interpolymer products.

However, it is important that the mixtures used in preparing the interpolymers be substantially free of styrene. The replacement of 5 percent or more of the vinyltoluene reactant with styrene results in a decrease in compatibility of the interpolymer products with solvents rich in aliphatic hydrocarbons, i. e. it results in an increase in the kauri butanol values which solvents for the interpolymers must possess. The presence of styrene in the polymerization mixtures also renders it more difficult to form the aforementioned stable, solvent-dispersible interpolymers having a gel structure. These detrimental effects become more pronounced with increase in the proportion of styrene present.

The starting materials used in making the interpolymers consist essentially of from 10 to 60 percent by weight of one or more nuclear methylated styrenes, preferably vinyltoluene; from 35 to 85 percent of one or more natural or synthetic ester-type drying oils; and from 0.4 to 5 percent of one or more of the aforementioned dialkenyl aromatic hydrocarbons, preferably divinylbenzene. The divinylbenzene which is commercially available comprises ar-ethylvinylbenzene. Therefore, the latter usually is present in the polymerization mixtures and becomes chemically combined in the interpolymer product, but is not required. The commercial grade of divinylbenzene comprises all of the isomeric divinylbenzenes together with the three isomeric ethylvinylbenzenes. It sometimes also contains the corresponding isomeric diethylbenzenes. Any of the isomeric divinylbenzenes, or any mixture thereof, can be used in making the interpolymer products of the invention.

Any of the isomeric ar-vinyltoluenes, or any mixture thereof, may also be employed as a starting material in preparing the interpolymers.

The unsaturated esters which are used in preparing the interpolymers have a property of drying, i. e. solidifying and hardening, under the action of air. They are naturally occurring, or synthetically prepared, esters of the unsaturated monocarboxylic acids contained in drying oils and semi-drying oils such as soybean, safflower, linseed, dehydrated castor, fish, and tall oils. The alcohol radical of such unsaturated ester is that of a polyhydric alcohol containing at least three hydroxyl groups in the molecule. The unsaturated esters may consist of a simple polyhydric alcohol such as glycerine or pentaerythritol chemically combined with one or more of the above-mentioned unsaturated monocarboxylic acids or of such alcohol esterified both with such unsaturated monocarboxylic acid and with a dicarboxylic acid, e. g. phthalic acid or sebacic acid. The drying oils mentioned above are unsaturated esters suitable for use in preparing the interpolymers of the invention. The unsaturated esters may be used directly as prepared or obtained, in making the interpolymers, or they may be heat-bodied prior to being employed in making the interpolymers. Linseed oil or soybean oil, either raw, alkali refined, or heat-bodied, are preferred. Since all of the unsaturated esters just mentioned have a property of solidifying and hardening under exposure to air, they are naturally occurring or synthetic drying oils and are referred to herein as such.

Mixtures of one or more nuclear methylated styrenes, preferably vinyltoluene; one or more natural or synthetic drying oils; and one or more of the aforementioned dialkenyl aromatic hydrocarbons, preferably divinylbenzene, in the above-stated proportions may be polymerized, by heating, in the presence or absence of polymerization catalysts and in the presence or absence of inert solvents or diluents. Usually a small amount (e. g. corresponding to from 0.1 to 3.0 percent of the combined weight of the vinyl aromatic starting materials) of an organic peroxide, such as dibenzoyl peroxide, dilauroyl peroxide, or cumene hydroperoxide, etc., is added to facilitate fairly rapid polymerization at moderately elevated temperatures. The mixtures containing 3 percent or less of divinylbenzene, or other dialkenyl aromatic hydrocarbons, based on the combined weight of the polymerizable starting materials are usually polymerized in the absence of solvents, or in the presence of minor amounts of solvents such as may be present in commercial grades of one or more of the polymerizable starting materials, although an inert solvent can be added if desired. When using larger proportions of the dialkenyl aromatic hydrocarbon, e. g. divinylbenzene, the polymerization occurs most smoothly and satisfactorily in the presence of a solvent and a solvent is usually, but not necessarily, added, e. g. in amount corresponding to half or more of the total volume of the polymerizable starting materials. Any inert organic liquid which is compatible with the polymerizable starting materials can be used as a medium for the reaction. Examples of suitable solvents are toluene, xylene, mineral spirits, etc.

The polymerization is accomplished by heating the mixture to a reaction temperature, usually of 150° C. or above. The starting materials may be admixed with one another prior to, or during, the reaction. A convenient procedure is to heat the drying oil to about 180° C. in a vessel provided with a reflux condenser and to add a solution of the other reactants and catalyst gradually or in portion-wise manner. A solvent, when employed, may be present together with the drying oil or be in the solution of the other reactants which is added, or both. After completing the addition, the mixture is usually heated gradually to a higher temperature, e. g. to about 240° C. or thereabout. During heating of the mixture, it may be protected against free access of air, e. g. by heating it in a closed container, or in contact with an inert gas such as nitrogen, but such avoidance of contact with air is usually not necessary. The limited amount of air in contact with the mixture during heating under reflux usually has little, if any, detrimental effect on the interpolymeric product. The polymerization is usually carried out in from 5 to 10 hours under the conditions just stated, but longer periods of heating may sometimes be required.

During the polymerization, the viscosity of the reaction mixture increases. Certain of the starting mixtures can be polymerized to form interpolymers having a gel structure, which interpolymers may be dissolved in mineral spirits to form solutions of 60 weight percent concentration having Gardner-Holdt viscosity values of T or above. As hereinbefore mentioned, the interpolymers having the gel structure are readily dispersible in solvents having kauri butanol values of 33 and higher to form clear to slightly hazy varnishes that can be applied to wood, etc., and dried to obtain clear, hard, adherent varnish films. They are particularly desirable as resins for the preparation of coating compositions. The ability to form these solvent-dispersible interpolymers having the gel structure varies with changes in composition of the aforementioned starting mixture. Mixtures of from 35 to 75 per cent of vinyltoluene, from 64 to 24 percent of linseed oil or soybean oil of any of the aforementioned qualities, and from 0.5 to 3.0 percent of divinylbenzene are preferably employed in making the interpolymers having the gel structure, but they may sometimes be obtained from other of the aforementioned starting mixtures.

The interpolymers of the invention may be stored out of free contact with air, i. e. in closed containers, and be used when desired in prepared the aforementioned coating compositions. They may be dissolved or dispersed in any of the aforementioned solvents, preferably mineral spirits, to form varnishes of good quality. Pigments may be admixed with the varnishes to obtain paints or enamels. Usual additives such as paint driers, fillers, etc., may be incorporated in the coating compositions, but are not required.

The following examples described a number of ways in which the invention has been practiced and illustrate certain of its advantages, but are not to be construed as limiting its scope.

EXAMPLE 1

This example illustrates the importance of employing a dialkenyl aromatic hydrocarbon, e. g., divinylbenzene, together with a drying oil and ar-vinyltoluene, in making the interpolymers of the invention. In each of several pairs of comparative experiments, a drying oil named in the following table was heated to 180° C. in a vessel provided with a reflux condenser. The heated drying oil was stirred and a mixture of vinyltoluene and di-tertiarybutyl peroxide, or of vinyltoluene, di-tertiarybutyl peroxide and a commercial grade of divinylbenzene, was added in six equal portions over a 2 hour period. In each experiment the catalyst, di-tertiarybutyl peroxide, was employed in a small amount corresponding to from 0.4 to 1.2 percent of the combined weight of all of the starting materials. The commercial grade of divinylbenzene which was employed contained about 22 percent by weight of divinylbenzene, about 43 percent of ar-ethylvinylbenzene, and about 35 percent of diethylbenzene. After completing the addition, heating at 180° C. was continued for 30 minutes. The mixture was then gradually heated to 240° C. in a period of 2.5 hours. Heating and stirring at 240° C. was continued for 2 hours. A small portion, i. e. from 1 to 2 grams of each product, was tested to determine the proportion of volatile material, principally unreacted vinyltoluene, therein. The test involved weighing the sample, heating it at 180° C. and atmospheric pressure in the open air for 1 hour, and again weighing it to determine the loss in weight due to vaporization of volatile material. All of the products were found to contain less than 5 weight percent of volatile material, thus indicating that the polymerizations were at least 95 percent complete. The remainder of each reacted mixture was cooled to about 150–160° C. and thinned with mineral spirits having a kauri butanol number of 33 to form a solution containing 60 percent by weight of the interpolymer product. A tube was partially filled with a portion of the solution, then closed and inverted so as to cause an air bubble to rise therethrough. The rising bubble was examined to determine whether the interpolymer possessed a gel structure. Such bubble formed in a gelatinous liquid, i. e. in a solution of an interpolymer having the gel structure, is nonspherical, e. g. somewhat egg shaped with a tail at the bottom. Another portion of each 60 percent interpolymer solution was tested for color in accordance with the Gardner color scale, and to determine the Gardner-Holdt viscosity thereof. A portion of each 60 percent interpolymer solution was thinned with a further amount of the mineral spirits to form a clear varnish suitable for application with a brush to form a film which, when dried, is of from 1 to 2 mils thickness. Approximately 0.04 percent by weight of cobalt and 0.4 percent of lead, in the form of cobalt and lead naphthenates, were admixed with the varnish. The varnish was applied as films on test plates, certain of which were of glass and others of tin. The times required for the films to dry to touch and to hardness at room temperature under exposure to air were determined. A varnish film was considered as having dried to touch when gentle pressing of the same with a finger showed it to be slightly tacky, but the varnish did not adhere to the finger. It was considered as dried to hardness when a piece of aluminum foil, firmly pressed against the film, did not adhere i. e. become stuck, to the film. At intervals of 1 day and 1 week after it had been applied on a glass plate, a film of each varnish was tested to determine its Sward hardness. Tin plates coated with films of each varnish were tested, 7 days after forming the films, for purpose of determining their resistance to attack by contact at room temperature with mineral spirits, gasoline, and an aqueous sodium hydroxide solution of 3 weight percent concentration, respectively. In each such test, a plate, coated on one face with the varnish film, was immersed in the liquid. At intervals the plate was removed from the liquid and the film was rubbed gently with the finger. Conversion of the film to a soft gel, or loosening of the film from the plate by the rubbing, was considered as failure of the film. The steps of thus testing each film and again immersing it in the liquid were discontinued when a film had failed. The time of immersion in the liquid until film failure occurred was noted. In instances in which film failure did not occur, the immersion tests using mineral spirits and gasoline were discontinued at the end of 72 hours and 36 hours, respectively. Seven days after it had been coated with a varnish, a tin plate was tested for flexibility of the varnish film thereon by folding it double over a 1/8 inch diameter mandrel. In this test, the films of runs 1, 2, 9 and 10 of the following table developed a few cracks; but all other films of the table remained uncracked. Table I identifies the starting materials employed in making each interpolymer and gives the proportions of the starting materials as parts by weight. The table indicates which of the interpolymers was found to have a gel structure. It also gives the Gardner color number and the Gardner-Holdt viscosity of the 60 percent solution of each varnish resin in mineral spirits. The times required for drying a film of each varnish to touch and to hardness; whether the hardened film was clear; the Sward rocker hardness values of the films at stated times after they had dried to hardness; and the results of the above-mentioned immersion tests, are also set forth. In the table, alkali refined linseed oil is abbreviated as "ARLO"; alkali refined soybean oil is abbreviated as "ARSO," vinyltoluene is abbreviated as "V. T."; and di-tertiarybutyl peroxide is abbreviated as "DTBP."

Table I

| Run No. | Reactants | | | | 60% polymer sol'n | | Varnish films | | | | | | | |
|---|---|---|---|---|---|---|---|---|---|---|---|---|---|---|
| | Drying oil | | V. T., pts. | DVB,[1] pts. | Color | Viscosity | Drying time to— | | Clarity | Hardness in— | | Time until failure in— | | |
| | Kind | Pts. | | | | | Touch, min. | Hardness, hrs. | | 1 day, percent | 1 wk., percent | Mineral spirits | Gasoline | NaOH sol'n |
| 1 | ARLO | 40 | 60 | 0 | 2-3 | F+ | 8 | 1.5-2 | Clear | 17 | 25 | 25 min. | 2 min. | 25 min. |
| 2 | ARLO | 40 | 54 | 1.32 | 2-3 | [2] W | 12 | 1.5-2 | ---do--- | 23 | 30 | >72 hrs. | >36 hrs. | 20 hrs. |
| 3 | ARLO | 45 | 55 | 0 | 2-3 | D | 12 | 2 | ---do--- | 15 | 18 | 15 min. | 3 min. | 10 min. |
| 4 | ARLO | 45 | 48 | 1.54 | 2-3 | [2] V | 15 | 2 | ---do--- | 20 | 26 | >72 hrs. | >36 hrs. | 7 hrs. |
| 5 | ARLO | 50 | 50 | 0 | 3 | C | 14 | 8-16 | ---do--- | 10 | 15 | 10 min. | 2 min. | 6 min. |
| 6 | ARLO | 50 | 42.5 | 1.65 | 3 | [2] U-V | 18 | 3.5 | ---do--- | 15 | 20 | >72 hrs. | >36 hrs. | 3 hrs. |
| 7 | ARLO | 55 | 45 | 0 | 3 | A | 30 | 32-48 | Sl. haze | 6 | 9 | 15 min. | 5 min. | 4 min. |
| 8 | ARLO | 55 | 35 | 2.2 | 3 | [2] T-U | 35 | 24 | Clear | 9 | 15 | >72 hrs. | >36 hrs. | 2 hrs. |
| 9 | ARSO | 40 | 60 | 0 | 2-3 | G | 60 | 5-6 | Sl. haze | 17 | 22 | 30 min. | 3 min. | 10 min. |
| 10 | ARSO | 40 | 53.5 | 1.43 | 2-3 | [2] Y- | 60 | 3.5 | Clear | 19 | 26 | >72 hrs. | 45 min. | 17 hrs. |
| 11 | ARSO | 45 | 55 | 0 | 2-3 | F-G | 60 | 7.5 | Sl. haze | 11 | 15 | 20 min. | 3 min. | 10 min. |
| 12 | ARSO | 45 | 48 | 1.54 | 2-3 | T+ | 80 | 7 | Clear | 16 | 21 | >72 hrs. | 1 hr. | 35 min. |
| 13 | ARSO | 55 | 45 | 0 | 3 | B+ | 110 | >48 | Cloudy | 3 | 5 | 3 min. | 1-2 min. | 1-2 min. |
| 14 | ARSO | 55 | 35 | 2.2 | 3 | [2] V-W | 100 | >48 | Clear | 6 | 8 | 3 hrs. | 15 min. | 10 min. |
| 15 | ARSO | 60 | 40 | 0 | 3 | A-B | 150 | >48 | Nearly opaque. | ([3]) | 3 | 3 min. | 1-2 min. | 1-2 min. |
| 16 | ARSO | 60 | 27 | 2.86 | 3 | [2] X-Y | 150-180 | >48 | Clear | 3 | 6 | 3 hrs. | 45 min. | 5 min. |

[1] The DVB actually present in the commercial material used.
[2] Test of solution indicates that polymer has a gel structure.
[3] Too low for test.

EXAMPLE 2

Tall oil esterified with pentaerythritol was employed as a synthetic drying oil in preparing two interpolymers, one of which was composed of vinyltoluene and the pentaerythritol-tall oil ester and was outside the scope of this invention, and the other of which was composed of the same starting materials together with a minor amount of divinylbenzene and is within the scope of the invention. The starting materials employed in making one of the copolymers consisted of 40 parts by weight of the pentaerythritol-tall oil ester, 60 parts of vinyltoluene, 1.2 parts of di-tertiarybutyl peroxide as catalyst. The starting materials used in making the other interpolymer consisted of 40 parts of said ester, 56 parts of vinyltoluene, 4 parts of a commercial grade of divinylbenzene containing 0.88 part of the latter, and 0.6 part of said catalyst. The procedure in making each interpolymer was similar to that described in Example 1, i. e. the synthetic drying oil was heated under reflux to 180° C., a solution composed of the other starting materials was added in portionwise manner, the temperature was gradually raised to 240° C. and the mixture was maintained at 240° C. until the polymerization was substantially complete. Each interpolymer product was dispersed in mineral spirits having a kauri butanol number of 33 to form a solution comprising the interpolymer in 60 weight percent concentration. The solution of the synthetic drying oil-vinyltoluene interpolymer was hazy and had a Gardner-Holdt viscosity of 0. The solution of the synthetic drying oil-vinyltoluene-divinylbenzene interpolymer was clear and had a viscosity of between X and Y. Each such solution was diluted with a further amount of mineral spirits to form a varnish which was applied to glass plates, and dried to form clear, hard varnish films on the plates. One week after forming the films on the plates they were tested, as in Example 1, for Sward rocker hardness, and for resistance to attack by mineral spirits, gasoline and an aqueous 3 weight percent sodium hydroxide solution, respectively. The identity of the interpolymer in each varnish and the results of these tests are given in Table II. Abbreviations used in the table are similar to those employed in Table I.

*Table II*

| Run No. | Interpolymers of— | Dried varnish films | | | |
|---|---|---|---|---|---|
| | | Hardness, percent | Time until failure in— | | |
| | | | Mineral spirits | Gasoline | NaOH sol'n |
| 1 | Ester—VT | 34 | 30 min | 2 min | 10 min |
| 2 | Ester—VT—DVB | 37 | 2.5 hrs | 18 min | 20 hrs |

EXAMPLE 3

This example shows that styrene cannot satisfactorily be used in place of a substantial portion, or all, of the nuclear methylated styrene, e. g. vinyltoluene, which is required by the invention. Interpolymers of the polymerizable starting materials identified in Table III, in the proportions indicated, were prepared by a procedure similar to that described in Example I. One of the interpolymers was not completely soluble, or dispersible, in solvents composed principally of aliphatic hydrocarbons to form a 60 weight solution thereof and was not further tested. The other interpolymers were dissolved in mineral spirits, of the quality employed in Examples 1 and 2, to form a solution containing 60 percent of the interpolymer, and the Gardner-Holdt viscosity of the solution at 25° C. was determined. The solutions thus prepared were diluted with mineral spirits to form varnishes which were applied to tin plates, dried, and tested for resistance to gasoline and to an aqueous 3 percent sodium hydroxide solution, as in Example 1. Table III names, and gives the parts by weight of, the polymerizable starting materials employed in making each interpolymer. It indicates the appearance and gives the Gardner-Holdt viscosity at 25° C. of each such solution. It gives the times of drying to touch and to hardness of films of varnishes prepared from the respective interpolymers and the appearance of the dried varnish films. It gives the times of immersion, in gasoline and the sodium hydroxide solution, respectively, until a dried film of each varnish failed by becoming softened or loosened from the glass plate on which it was formed. In the table, styrene is abbreviated as "S." Other abbreviations are similar to those employed in the preceding examples.

EXAMPLE 4

This example illustrates use of diisopropenylbenzene, instead of divinylbenzene, in preparing an interpolymer of the invention. An interpolymer of 50 parts by weight of alkali refined linseed oil, 42 parts of vinyltoluene, and 8 parts of diisopropenylbenzene was prepared by a procedure similar to that described in Example 1. The interpolymer was dissolved in mineral spirits having a kauri butanol number of 33 to form a 60 weight percent solution thereof. This solution, i. e. varnish, was clear and had a Gardner-Holdt viscosity of E at 25° C. The varnish was applied to a glass plate and a tin plate. The resulting varnish film dried to touch in about 55 minutes and to hardness in approximately 6.5 hours. The dried film adhered tightly to the glass and was clear, i. e. transparent. One week after forming the varnish film on the tin plate, it was tested, as in the preceding examples, for resistance to gasoline by immersion in the latter at room temperature for 36 hours. The film did not fail, i. e. become soft or loosened from the plate, during this test.

EXAMPLE 5

A solution, consisting of 65 parts by weight of heat-bodied linseed oil having a Gardner-Holdt viscosity of Z–2 and 150 parts of mineral spirits having a kauri butanol number of 33, was heated under reflux to 180° C. Another solution, consisting of 25 parts of vinyltoluene, 10 parts of a commercial grade of divinylbenzene (containing 2.2 parts of the compound, divinylbenzene), and 0.7 part of di-tertiarybutyl peroxide was added in portionwise manner and with stirring to the heated linseed oil solution in a period of 2 hours. The mixture was maintained at 180° C. for about 5 hours. It was then cooled to room temperature. There was thus formed a clear solution of the interpolymer product in mineral spirits, which solution contained approximately 40 percent by weight of the interpolymer. The solution had a Gardner-Holdt viscosity at 25° C. of Z. It was thinned with a further amount of the mineral spirits to form a varnish suitable for application with a brush and the varnish was applied as thin films to test plates. The varnish films dried at room temperature to touch in 30 minutes and to hardness in between 8 and 16 hours. The dried films were clear. One day after being applied to a glass plate, a dried film of the varnish had a Sward rocker hardness value of 10 percent.

EXAMPLE 6

This example illustrates use of several synthetic drying oils as starting materials in preparing interpolymers within the scope of the invention. The synthetic drying oils which were employed in making the respective interpolymers are:

(A) A liquid ester of soybean oil fatty acids and a hydroxy ethoxy derivative of a phenol-formaldehyde condensation product, which derivative is a phenol-formaldehyde condensation product modified by having the phenolic hydroxyl groups thereof esterified with ethylene glycol.

*Table III*

| Run No. | Interpolymer of— | | | | 60% polymer sol'n | | Varnish films | | | |
|---|---|---|---|---|---|---|---|---|---|---|
| | ARLO, pts. | VT, pts. | S, pts. | DVB, pts. | Viscosity | Clarity | Drying time to— | | Clarity | Time until failure in— |
| | | | | | | | Touch, min. | Hardness, hrs. | | Gasoline | NaOH solution |
| 1 | 45 | 0 | 48 | 1.54 | Not compatible | | | | | | |
| 2 | 45 | 24 | 24 | 1.54 | V+ | Cloudy | 30 | 3.5 | Sl. haze | 30 min | 2 min |
| 3 | 45 | 48 | | 1.54 | U–V | Clear | 20 | 2.5 | Clear | >36 hrs | 6.5 hrs |

(B) A liquid ester formed by reaction of soybean oil fatty acids with a condensation product of epichlorohydrin and 2,2-bis-(4-hydroxyphenyl) propane.

(C) A liquid oil-modified alkyd resin which is a condensation product of 42.7 parts by weight of soybean oil fatty acids, 14.4 parts of dehydrated castor oil fatty acids, 19.9 parts of pentaerythritol, 21 parts of phthalic anhydride, and 2.1 parts of Benthal (a monobasic acid marketed for use in paint and varnish vehicles).

(D) A liquid oil-modified alkyd resin which is a condensation product of 61.3 parts by weight of soybean oil fatty acids, 18.8 parts of pentaerythritol, 18.1 parts of phthalic anhydride, and 1.8 parts of benzoic acid.

For convenience, these synthetic drying oils will be referred to as (A), (B), (C) and (D), respectively. In each experiment, one of the synthetic drying oils, or a solution of the same and mineral spirits having a kauri butanol value of 33, was heated under reflux to 180° C. and a solution consisting of vinyltoluene, a commercial grade of divinylbenzene in amount containing the parts by weight of divinylbenzene indicated in Table IV, and 2 percent by weight of di-tertiary-butyl peroxide was added portionwise with stirring over a 2 hour period. Thereafter, each mixture which contained mineral spirits was maintained at 180° C. for about 5 hours, whereas each mixture that did not contain mineral spirits was maintained at 180° C. for 30 minutes, after which the temperature was gradually raised to 240° C. during a period of from 2 to 2.5 hours. Each mixture was then cooled and diluted, if necessary, with a further amount of the mineral spirits to form a clear solution containing 60 percent by weight of the interpolymer product. One of the reaction mixtures initially contained said amount of mineral spirits and dilution of the product was not necessary. The Gardner-Holdt viscosity at 25° C. of each of the solutions was determined. Each solution was diluted with a further amount of the mineral spirits to form a varnish convenient for application with a brush. Each varnish was used to coat test plates and the times required for the varnish films to dry at room temperature to touch and to hardness were determined. Thereafter, the plates were tested, as in Example 1, to determine the resistance of the dried varnish films to attack by gasoline and by an aqueous 3 percent sodium hydroxide solution. Table IV indicates which of the above-mentioned synthetic drying oils was used in making each interpolymer, identifies the other polymerizable starting materials used in making each interpolymer, and gives the parts by weight of each of said starting materials and also of mineral spirits initially present in a polymerization mixture. It gives the results of the above tests of the interpolymers which were formed. Abbreviations employed in the table are the same as were used in Table I.

*Table IV*

| Run No. | Starting materials | | | | | Viscosity of 60% sol'n of interpolymer | Varnish films | | | |
|---|---|---|---|---|---|---|---|---|---|---|
| | Synthetic drying oil | | V. T., pts. | DVB, pts. | Mineral spirits, pts. | | Drying time to— | | Time until failure in— | |
| | Kind | Pts. | | | | | Touch, min. | Hardness, hrs. | Gasoline, hrs. | NaOH solution |
| 1 | A | 75 | 23 | 0.44 | 0 | Z-3 | 60 | 8-16 | >36 | 80 min. |
| 2 | B | 75 | 23 | 0.44 | 0 | R | 50 | 8-16 | >36 | 27 hrs. |
| 3 | C | 55 | 43 | 0.44 | 42 | Z-7 | 20 | 8 | >36 | 48-72 hrs. |
| 4 | D | 65 | 25 | 2.2 | 58 | Y | 20 | 6-7 | >36 | 48-72 hrs. |

We claim:

1. An interpolymer of the monomer mixture consisting essentially of (a) from 10 to 60 percent by weight of at least one nuclear methylated styrene, (b) from 35 to 85 percent of at least one ester of at least one polyhydric alcohol containing at least three hydroxyl groups in the molecule and at least one unsaturated aliphatic monocarboxylic acid of the group consisting of drying oil acids and semi-drying oil acids, which ester has a property of solidifying under the action of air and (c) from 0.4 to 5 percent of at least one dialkenyl aromatic hydrocarbon, wherein each alkenyl radical of the molecule is of the group consisting of vinyl and isopropenyl radicals, the monomer mixture containing not more than 5 percent of styrene, which interpolymer is capable of being dispersed in mineral spirits having kauri butanol numbers of at least 33 to form clear to slightly cloudy varnishes that can be applied as thin coatings on solid base members and dried under exposure to air to form clear, solid varnish films.

2. An interpolymer, as claimed in claim 1, wherein the nuclear methylated styrene is vinyltoluene.

3. An interpolymer, as claimed in claim 1, wherein the unsaturated ester is an alkyd resin comprising drying oil fatty acid radicals in the molecule.

4. An interpolymer, as claimed in claim 1, wherein the unsaturated ester is a drying oil.

5. An interpolymer, as claimed in claim 1, wherein the dialkenyl aromatic hydrocarbon is divinylbenzene.

6. An interpolymer, as claimed in claim 1, wherein the nuclear methylated styrene is vinyltoluene, the unsaturated ester is a drying oil, and the dialkenyl aromatic hydrocarbon is divinylbenzene.

7. An interpolymer, as claimed in claim 6, wherein the drying oil is linseed oil.

8. An interpolymer, as claimed in claim 6, wherein the drying oil is soybean oil.

9. A method of making an interpolymer that is dispersible in varnish solvents having kauri butanol numbers of at least 33 and that has a property of hardening under the action of air, which method comprises heating together, a mixture of polymerizable compounds consisting of from 10 to 60 percent by weight of at least one nuclear methylated styrene, from 35 to 85 percent of at least one ester of at least one polyhydric alcohol containing at least three hydroxyl groups in the molecule and at least one unsaturated aliphatic monocarboxylic acid of the group consisting of drying oil acids and semi-drying oil acids, which ester has a property of solidifying under the action of air, and from 0.4 to 5 percent of at least one dialkenyl aromatic hydrocarbon wherein each alkenyl radical of the molecule is of the group consisting of vinyl and isopropenyl radicals, the above proportions being based on the combined weight of the starting materials just mentioned.

10. A method, as claimed in claim 9, wherein the methylated styrene is vinyltoluene, the unsaturated ester is a drying oil, and the dialkenyl aromatic hydrocarbon is divinylbenzene.

11. A method, as claimed in claim 10, wherein the drying oil is linseed oil.

12. A method, as claimed in claim 10, wherein the drying oil is soybean oil.

References Cited in the file of this patent

UNITED STATES PATENTS 2,468,798    Young et al.   May 3, 1949
2,602,071    Haines   July 1, 1952